US012761186B2

(12) United States Patent
Grenier et al.

(10) Patent No.: US 12,761,186 B2
(45) Date of Patent: Oct. 13, 2026

(54) METHOD AND SYSTEM USING PRE-QUALIFIED REFERENCE DATA IN VIBRATION SYSTEM

(71) Applicant: ILLINOIS TOOL WORKS INC., Glenview, IL (US)

(72) Inventors: Glen Charles Grenier, Ray, MI (US); Maureen Bitney, Minnetonka, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 353 days.

(21) Appl. No.: 18/485,853

(22) Filed: Oct. 12, 2023

(65) Prior Publication Data

US 2024/0133842 A1 Apr. 25, 2024
US 2024/0230595 A9 Jul. 11, 2024

Related U.S. Application Data

(60) Provisional application No. 63/417,843, filed on Oct. 20, 2022.

(51) Int. Cl.
*G01N 29/04* (2006.01)
*G01N 29/22* (2006.01)

(52) U.S. Cl.
CPC ............. *G01N 29/04* (2013.01); *G01N 29/22* (2013.01)

(58) Field of Classification Search
None
See application file for complete search history.

(56) References Cited

U.S. PATENT DOCUMENTS 3,389,789 A * 6/1968 Watson .................. G01N 21/89 209/939
3,855,841 A 12/1974 Hunter
(Continued)

FOREIGN PATENT DOCUMENTS

CA 2347742 A1 4/2000
CN 114755027 A 7/2022
(Continued)

OTHER PUBLICATIONS

International Search Report and Written Opinion in corresponding International Application No. PCT/US2023/076870 dated Feb. 9, 2024.

(Continued)

*Primary Examiner* — Suman K Nath
(74) *Attorney, Agent, or Firm* — Steven M. Koehler; Westman, Champlin & Koehler, P.A.

(57) ABSTRACT

A method used in a system allows an operator to use pre-qualified reference data to determine limits in the same statistical domain for one or more outputs, which can be used to qualify reference data for use during a test. With this method, each drive is applied to the system where a controller receives the data. The controller automatically scrutinizes the data received comparing each output received to its associated set of acceptable limits. If one or more of the limits are violated, the output(s) will be identified to the operator and the received data will be disqualified or otherwise not used. When received response data does indeed meet all limits, the data can be considered qualified reference data that is then used during testing.

16 Claims, 11 Drawing Sheets

(56) References Cited

U.S. PATENT DOCUMENTS

| | | | |
|---|---|---|---|
| 4,061,017 | A | 12/1977 | Sloane et al. |
| 4,480,480 | A | 11/1984 | Scott et al. |
| 4,513,622 | A | 4/1985 | Uretsky |
| 4,537,076 | A | 8/1985 | Lax et al. |
| 4,885,692 | A | 12/1989 | Kurihara et al. |
| 4,916,632 | A | 4/1990 | Doi et al. |
| 4,989,158 | A | 1/1991 | Sloane |
| 5,003,819 | A | 4/1991 | Koopman |
| 5,111,685 | A | 5/1992 | Langer |
| 5,175,678 | A | 12/1992 | Frerichs et al. |
| 5,209,661 | A | 5/1993 | Hildreth et al. |
| 5,311,421 | A | 5/1994 | Nomura et al. |
| 5,339,016 | A | 8/1994 | Thoen |
| 5,353,207 | A | 10/1994 | Keeler et al. |
| 5,377,307 | A | 12/1994 | Hoskins et al. |
| 5,568,404 | A | 10/1996 | Strumolo |
| 5,572,440 | A | 11/1996 | Harashima et al. |
| 5,598,076 | A | 1/1997 | Neubauer et al. |
| 5,598,329 | A | 1/1997 | Niemann |
| 5,610,330 | A | 3/1997 | Fricke et al. |
| 5,649,063 | A | 7/1997 | Bose |
| 5,677,609 | A | 10/1997 | Khan et al. |
| 5,729,463 | A | 3/1998 | Koenig et al. |
| 5,901,072 | A | 5/1999 | Shimmell |
| 5,908,122 | A | 6/1999 | Robinett et al. |
| 5,914,830 | A | 6/1999 | Kadlec et al. |
| 5,942,673 | A | 8/1999 | Horiuchi et al. |
| 5,949,989 | A | 9/1999 | Falkowski et al. |
| 6,285,972 | B1 | 9/2001 | Barber |
| 6,457,352 | B1 | 10/2002 | Knestel |
| 6,457,369 | B1 | 10/2002 | Petersen |
| 6,997,049 | B2 | 2/2006 | Lacey, Jr. |
| 7,031,949 | B2 | 4/2006 | Lund |
| 8,955,397 | B2 | 2/2015 | Saari et al. |
| 2004/0230394 | A1 | 11/2004 | Saari et al. |
| 2008/0134773 | A1 | 6/2008 | Parison |
| 2013/0104670 | A1 | 5/2013 | Saari et al. |
| 2015/0005982 | A1 * | 1/2015 | Muthukumar ........ B60T 8/1725 701/1 |

FOREIGN PATENT DOCUMENTS

| | | | |
|---|---|---|---|
| EP | 1746402 | A2 | 1/2007 |
| JP | H10-206288 | A | 8/1998 |
| JP | 2003-521015 | A | 7/2003 |
| JP | 6223008 | B2 | 11/2017 |
| JP | 2022026260 | A | 2/2022 |
| WO | 8503547 | A1 | 8/1985 |
| WO | 9742553 | A1 | 11/1997 |

OTHER PUBLICATIONS

Office Action in corresponding Japanese patent application No. 2025-522593 dated Jun. 2, 2026.

* cited by examiner

104

128 128 128 128 128 128

☑ Maximum | ☑ Minimum | ☐ Mean | ☑ RMS | ☑ Standard Deviation | ☑ Range

| | Channel Name | Full Scale | Unit | ☑ Active | Calculation Method | Abort | | | | |
|---|---|---|---|---|---|---|---|---|---|---|
| | | | | | | Lower Limit | Reference Value | Upper Limit | Lower Tolerance % | Upper Tolerance % |
| 1 | LF Displacement | 100,0000 | mm | ☑ | Statistics | 7.9563 | 9.9453 | 11.9344 | 20.0000 | 20.0000 |
| 2 | RF Displacement | 100,0000 | mm | ☑ | Statistics | 16.0840 | 20.1049 | 24.1259 | 20.0000 | 20.0000 |
| 3 | LR Displacement | 100,0000 | mm | ☑ | Statistics | 24.0367 | 30.0459 | 36.0551 | 20.0000 | 20.0000 |
| 4 | RR Displacement | 100,0000 | mm | ☑ | Statistics | 32.0497 | 40.0621 | 48.0746 | 20.0000 | 20.0000 |
| 5 | LF Vert Accel | 50,0000 | g | ☑ | Statistics | 0.0586 | 0.0732 | 0.0879 | 20.0000 | 20.0000 |
| 6 | RF Vert Accel | 50,0000 | g | ☑ | Statistics | 0.1166 | 0.1458 | 0.1749 | 20.0000 | 20.0000 |
| 7 | LR Vert Accel | 50,0000 | g | ☑ | Statistics | 0.1698 | 0.2123 | 0.2547 | 20.0000 | 20.0000 |
| 8 | RR Vert Accel | 50,0000 | g | ☑ | Statistics | 0.2237 | 0.2796 | 0.3355 | 20.0000 | 20.0000 |
| 9 | LF Output | 10,0000 | v | ☑ | Statistics | 0.1776 | 0.2220 | 0.2664 | 20.0000 | 20.0000 |
| 10 | RF Output | 10,0000 | v | ☑ | Statistics | 0.3581 | 0.4477 | 0.5372 | 20.0000 | 20.0000 |
| 11 | LR Output | 10,0000 | v | ☑ | Statistics | 0.5352 | 0.6691 | 0.8029 | 20.0000 | 20.0000 |
| 12 | RR Output | 10,0000 | v | ☑ | Statistics | 0.7137 | 0.8921 | 1.0706 | 20.0000 | 20.0000 |

106 107 109 112 116 114 122 124

FIG. 6

130

| | Channel Name |
|---|---|
| 1 | LF Displacement |
| 2 | RF Displacement |
| 3 | LR Displacement |
| 4 | RR Displacement |
| 5 | LF Vert Accel |
| 6 | RF Vert Accel |
| 7 | LR Vert Accel |
| 8 | RR Vert Accel |
| 9 | LF Output |
| 10 | RF Output |
| 11 | LR Output |
| 12 | RR Output |
| 13 | FRONT |
| 14 | REAR |
| 15 | FR SHOCK |
| ... | |

FIG. 9

METHOD AND SYSTEM USING PRE-QUALIFIED REFERENCE DATA IN VIBRATION SYSTEM

BACKGROUND OF THE INVENTION

The discussion below is merely provided for general background information and is not intended to be used as an aid in determining the scope of the claimed subject matter.

The present invention relates to a control of a system, machine or process. More particularly, the present invention relates to obtaining reliable data in a vibration or other actuator controlled test system.

Vibration systems that are capable of simulating loads and/or motions applied to test specimens are generally known. Vibration systems are widely used for performance evaluation, durability tests, and various other purposes as they are highly effective in the development of products. For instance, it is quite common in the development of automobiles, motorcycles, or the like, to subject the vehicle or a substructure thereof to a laboratory environment that simulates operating conditions such as a road or test track. Physical simulation in the laboratory involves a well-known method of data acquisition and analysis in order to develop drive signals that can be applied to the vibration system to reproduce the operating environment. This method includes instrumenting the vehicle with transducers "remote" to the physical inputs of the operating environment. Common remote transducers include, but are not limited to, strain gauges, accelerometers, and displacement sensors, which implicitly define the operating environment of interest. The vehicle is then driven in the same operating environment, while remote transducer responses (internal loads and/or motions) are recorded. During simulation with the vehicle mounted to the vibration system, actuators of the vibration system are driven so as to reproduce the recorded remote transducer responses on the vehicle in the laboratory.

However, before simulated testing can occur, the relationship between the input drive signals to the vibration system and the responses of the remote transducers must be characterized in the laboratory. Typically, this "system identification" procedure involves obtaining a respective model or transfer function of the complete physical system (e.g. vibration system, test specimen, and remote transducers) hereinafter referred to as the "physical system"; calculating an inverse model or transfer function of the same; and using the inverse model or transfer function to iteratively obtain suitable drive signals for the vibration system to obtain substantially the same response from the remote transducers on the test specimen in the laboratory situation as was found in the operating environment.

As those skilled in the art would appreciate, this process of obtaining suitable drive signals is not altered when the remote transducers are not physically remote from the test system inputs (e.g. the case where "remote" transducers are the feedback variables, such as force or motion, of the vibration system controller).

Although the above-described system and method for obtaining drive signals for a vibration system has enjoyed substantial success, there is a continuing need to improve such systems. In particular, there is a need to improve confidence in the data obtained during testing.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A method used in a system allows an operator to use pre-qualified reference data to determine limits in the same statistical domain for one or more outputs, which can be used to qualify reference data for use during a test. With this method, each drive is applied to the system where a controller receives the data. The controller automatically scrutinizes the data received comparing each output received to its associated set of acceptable limits. If one or more of the limits are violated, the output(s) will be identified to the operator and the received data will be disqualified or otherwise not used. When received response data does indeed meet all limits, the data can be considered qualified reference data that is then used during testing.

The method and system determine the first acceptable limit values based on the pre-qualified reference values and this may include calculating the first acceptable limit values from the pre-qualified reference values corresponding to each output.

Rendering to the operator on the display may include rendering the pre-qualified reference value for associated output and identifying that the pre-qualified reference value is to be replaced with a value from the received response. In such case, the method and system replace each pre-qualified reference value with the associated value from the response when the associated value does not violate the associated first acceptable limit values.

In one embodiment, after rendering to the operator on the display the one or more acceptable first limit values associated with each of the outputs of the response, an input from an input device can be received from the operator which may include one or more adjustments to the one or more acceptable first limit values associated with each of the outputs of the response.

The acceptable first limit values can correspond to a statistical measure of each output measured over a time period. Without limitation, the statistical measure can be at least one of a minimum value during the time period, a maximum value during the time period, a mean value during the time period, a root mean square value during the time period, or a standard deviation value during the time period. The acceptable first limit values can be associated with two or more statistical measures. The method may include prior to obtaining the acceptable first limit values associated with each of the outputs of the response from the another portion of memory, deriving the first drive by applying successive test drives to the physical system and comparing associated received responses until the associated received response suitably corresponds to a desired response, and then storing the desired response in the another portion of memory as the pre-qualified reference data.

The method and system can allow generation of qualified reference data for each drive used in a test and therefore may include accessing pre-qualified second reference data having pre-qualified second reference values for the outputs and rendering to the operator on the display one or more acceptable second limit values associated with each of the outputs of the response. After applying the first drive, a second drive is generated using the controller and the second drive is applied to the physical system. The controller receives a second response from the physical system. For each output of the second response, a received value is compared with the associated one or more second limit values where one or more outputs having a value violating one or more of the acceptable second limit values for the associated output of the second response are identified on the display.

BRIEF DESCRIPTION OF THE DRAWINGS

FIGS. 6-8 are different depictions of a GUI table rendered on a display during a method for obtaining the qualified reference data.

FIG. 9 is a GUI table for selecting outputs for pre-qualified reference data.

DETAILED DESCRIPTION OF THE PREFERRED EMBODIMENTS

Figure 1:
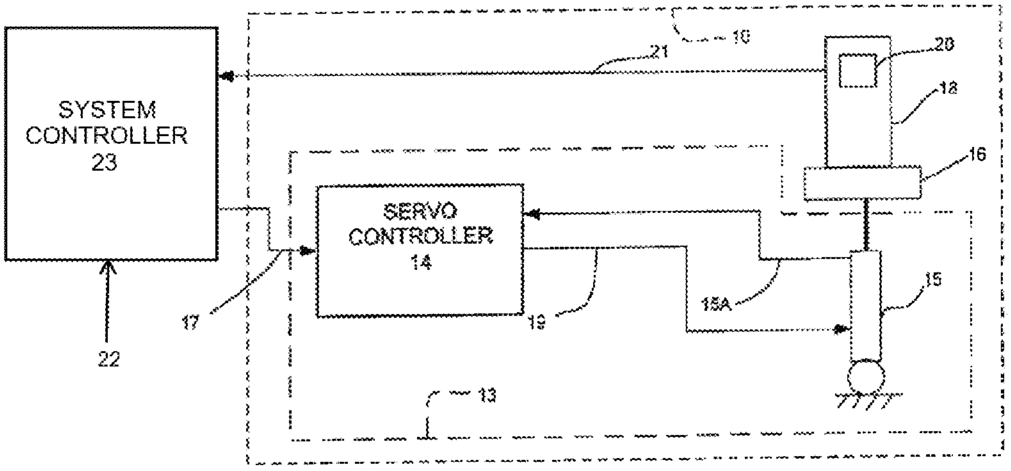
FIG. 1 is a block diagram of an exemplary environment for practicing the present invention.

FIG. 1 illustrates a physical system 10. The physical system 10 generally includes a vibration system 13 comprising a servo controller 14 and an actuator 15. In the schematic illustration of FIG. 1, the actuator 15 represents one or more actuators that are coupled through a suitable mechanical interface 16 to a test specimen 18. The servo controller 14 provides an actuator command signal 19 to the actuator 15, which in turn, excites the test specimen 18. Suitable feedback 15A is provided from the actuator 15 to the servo controller 14. One or more remote transducers 20 on the test specimen 18, such as displacement sensors, strain gauges, accelerometers, or the like, provide a measured or actual response 21. A physical system controller 23 receives the actual response 21 as feedback to compute a drive 17 as input to the physical system 10. In one embodiment of an iterative process discussed below, the physical system controller 23 generates the drive 17 for the physical system 10 based on the comparison of a desired response provided at 22 and the actual response 21 of the remote transducer 20 on the test specimen 18. Although illustrated in FIG. 1 for the single channel case, multiple channel embodiments with response 21 comprising N response components and the drive 17 comprising M drive components are typical.

Figure 2:
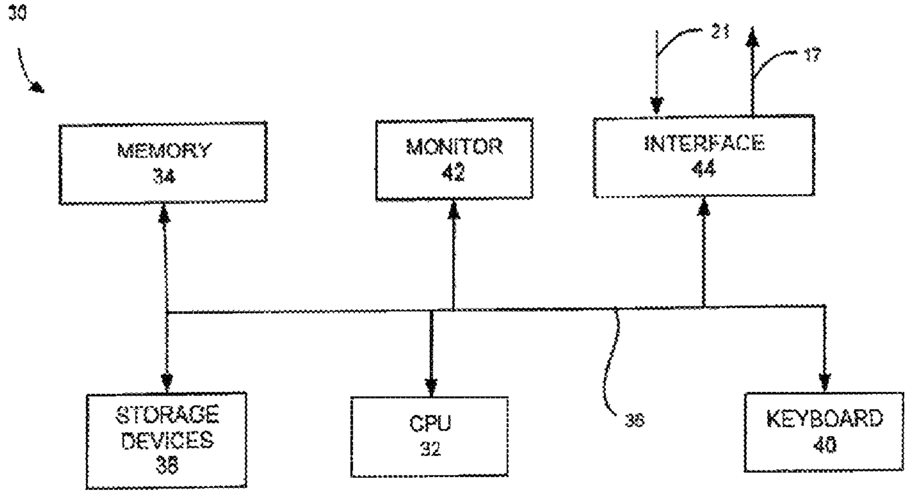
FIG. 2 is a computer for implementing the present invention.

FIG. 2 and the related discussion provide a brief, general description of a suitable computing environment in which the invention may be implemented. Although not required, the physical system controller 23 will be described, at least in part, in the general context of computer-executable instructions, such as program modules, being executed by a computer 30. Generally, program modules include routine programs, objects, components, data structures, etc., which perform particular tasks or implement particular abstract data types. The program modules are illustrated below using block diagrams and flowcharts. Those skilled in the art can implement the block diagrams and flowcharts to computer-executable instructions. Moreover, those skilled in the art will appreciate that the invention may be practiced with other computer system configurations, including multi-processor systems, networked personal computers, mini computers, main frame computers, and the like. The invention may also be practiced in distributed computing environments where tasks are performed by remote processing devices that are linked through a communications network. In a distributed computer environment, program modules may be located in both local and remote memory storage devices.

The computer 30 illustrated in FIG. 2 comprises a conventional personal or desktop computer having a central processing unit (CPU) 32, memory 34 and a system bus 36, which couples various system components, including the memory 34 to the CPU 32. The system bus 36 may be any of several types of bus structures including a memory bus or a memory controller, a peripheral bus, and a local bus using any of a variety of bus architectures. The memory 34 includes read only memory (ROM) and random access memory (RAM). A basic input/output (BIOS) containing the basic routine that helps to transfer information between elements within the computer 30, such as during start-up, is stored in ROM. Storage devices 38, such as a hard disk, a floppy disk drive, an optical disk drive, etc., are coupled to the system bus 36 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 34 from at least one of the storage devices 38 with or without accompanying data.

An input device 40 such as a keyboard, pointing device (mouse), or the like, allows the user to provide commands to the computer 30. A monitor 42 or other type of output device is further connected to the system bus 36 via a suitable interface and provides feedback to the user. The desired response 22 can be provided as an input to the computer 30 through a communications link, such as a modem, or through the removable media of the storage devices 38. The drive signals 17 are provided to the physical system 10 of FIG. 1 based on program modules executed by the computer 30 and through a suitable interface 44 coupling the computer 30 to the vibration system 13. The interface 44 also receives the actual response 21.

Before describing the present invention, it may also be helpful to review, in detail, a known method for modeling the physical system 10 and obtaining the drive 17 to be applied thereto. Although described below with respect to a test vehicle, it should be understood that this prior art method and the present invention discussed below are not confined to testing only vehicles, but can be used on other processes, types of test specimens and substructures or components thereof. In addition, the description is done assuming spectral analysis based modeling estimation and implementation though operations can be carried by several other mathematical techniques (e.g. Adaptive Inverse Control (AIC) type models, parametric regression techniques such as Auto Regressive Exogenous (ARX) and State Space types of models, or combinations thereof).

Figure 3A:
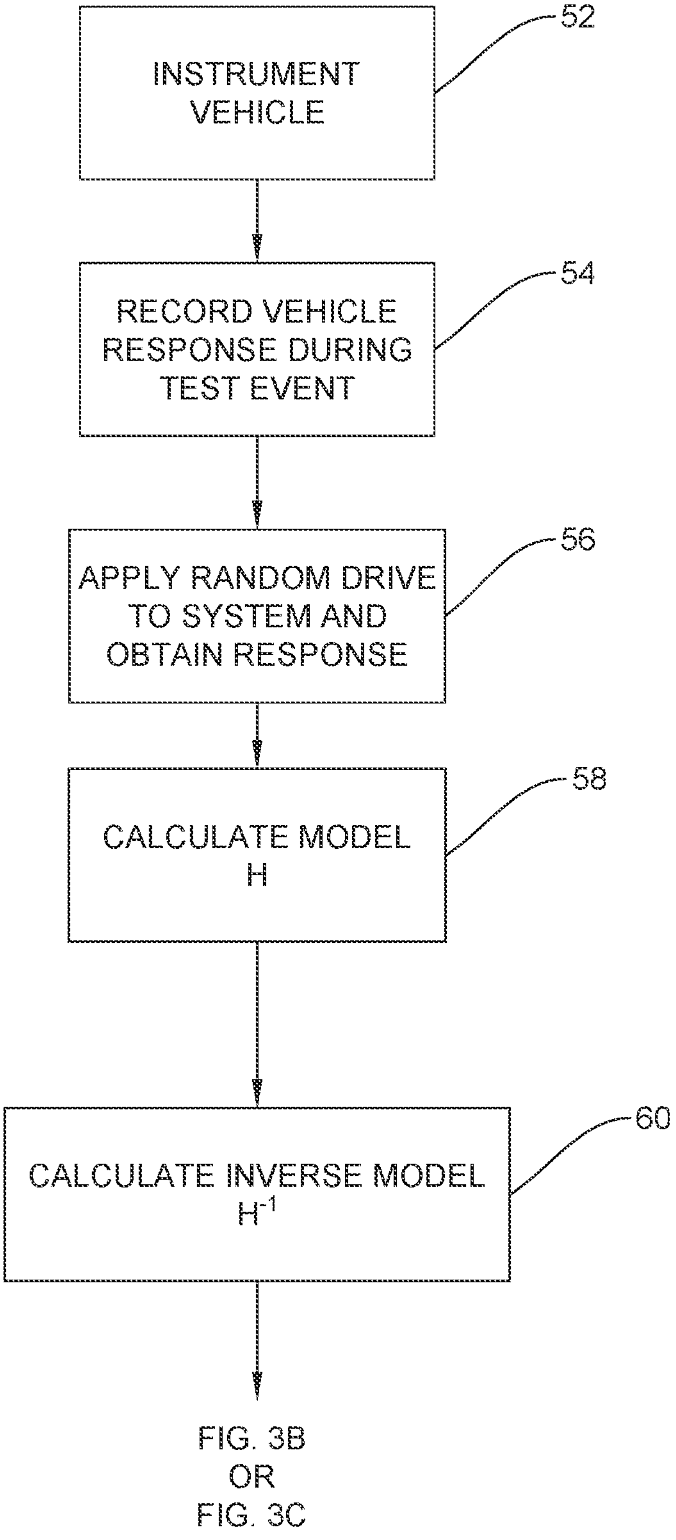
FIG. 3A is a flow chart illustrating the steps involved in an identification phase of a prior art method of vibration testing.

Referring to FIG. 3A, at step 52, the test vehicle is instrumented with the remote transducers 20. At step 54, the vehicle is subjected to the field operating environment of interest and the remote transducer responses are measured and recorded. For instance, the vehicle can be driven on a road or test track. The measured remote transducer responses, typically analog, are stored in the computer 30 in a digital format through analog-to-digital converters, as is commonly known.

Next, in an identification phase, the input/output model of the physical system 10 is determined. This procedure includes providing drive 17 as an input to the physical system 10 and measuring the remote transducer response 21 as an output at step 56. The drive 17 used for model estimation can be random "white noise" having frequency components over a selected bandwidth. At step 58, an estimate of the model of the physical system 10 is calculated based on the input drive applied and the remote transducer response obtained at step 56. In one embodiment, this is commonly known as the "frequency response function" (FRF). Mathematically, the FRF is a N×M matrix wherein each element is a frequency dependent complex variable (gain and phase versus frequency). The columns of the matrix correspond to the inputs, while the rows correspond to the outputs. As appreciated by those skilled in the art, the FRF may also be obtained directly from prior tests using the physical system 10 or other systems substantially similar to the physical system 10.

An inverse model $H(f)^{-1}$ is needed to determine the physical drive 17 as a function of the remote responses at step 60. As appreciated by those skilled in the art, the inverse model can be calculated directly. Also, the term "inverse" model as used herein includes a M×N "pseudo-inverse" model for a non-square N×M system. Furthermore, different forward models H and the inverse models $H(f)^{-1}$ can be used such as regions with "brakes on" and "brakes off" in a spindle coupled vehicle test system.

Figure 3B:
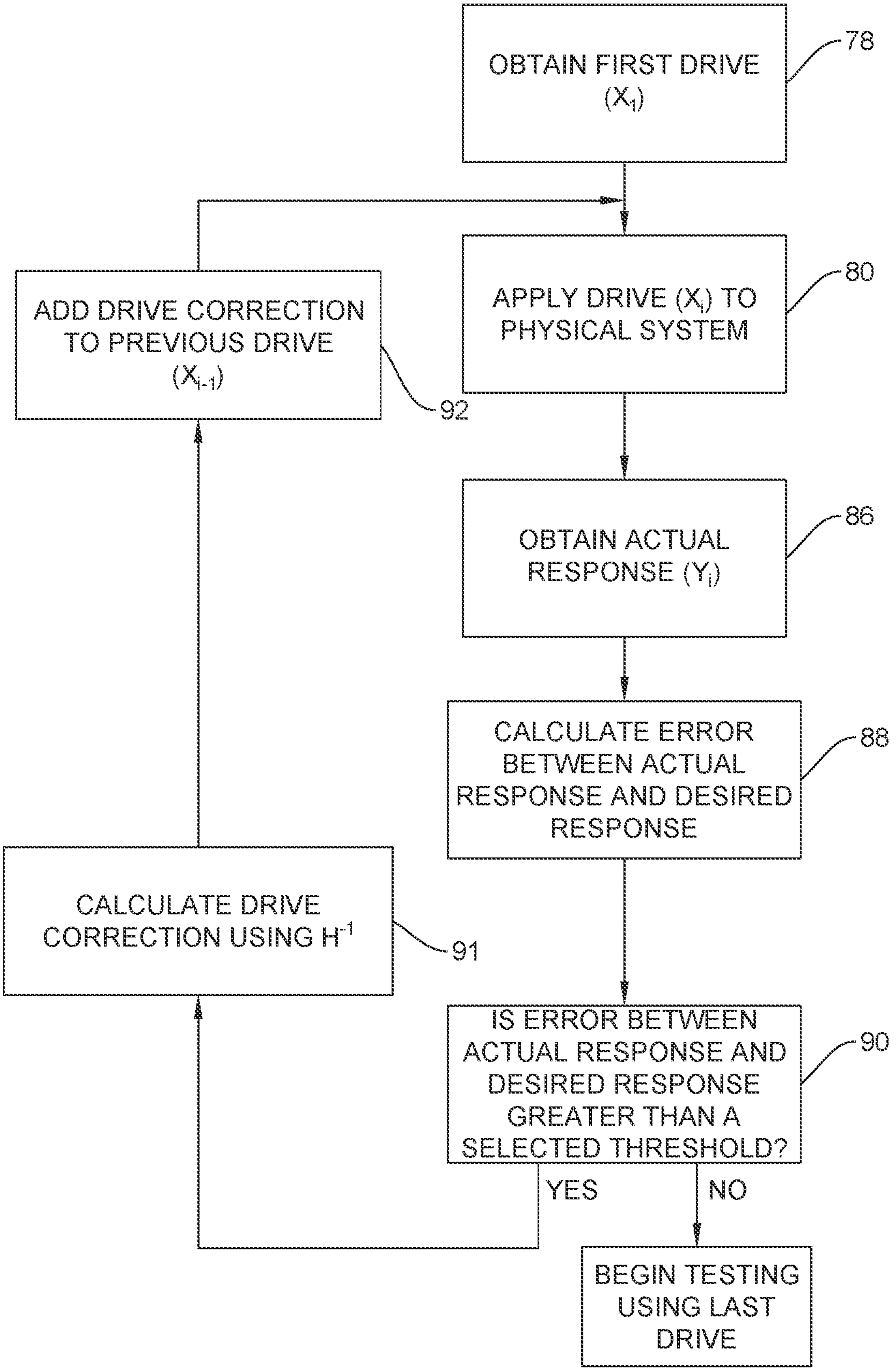
FIG. 3B is a flow chart illustrating the steps involved in an iterative phase of a prior art method of vibration testing.
Figure 4A:
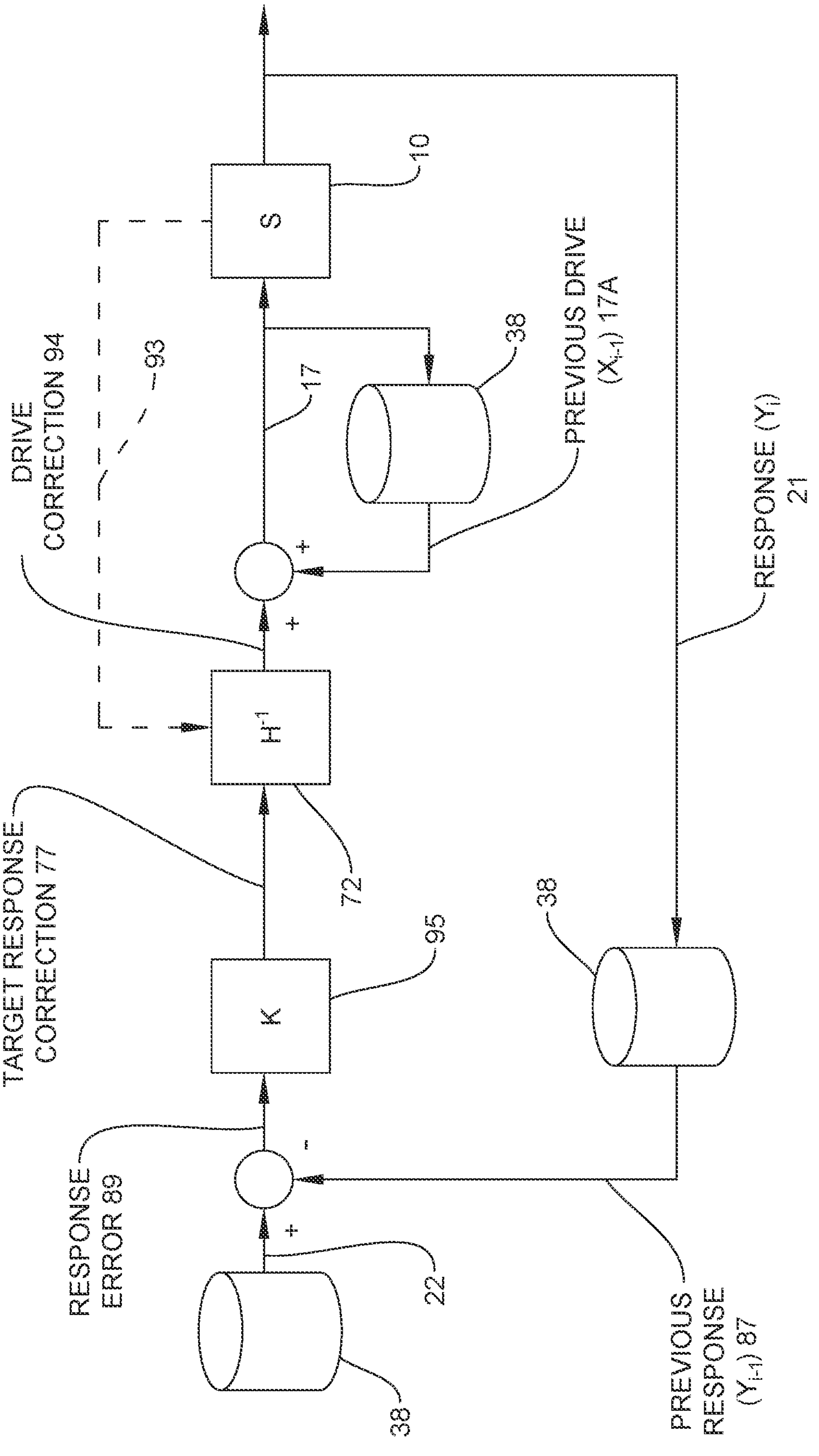
FIG. 4A is a detailed block diagram of a prior art iterative process for obtaining drive signals for a vibration system.

At this point in the prior art, the method enters an iterative phase, illustrated in FIGS. 3B and 4A, to obtain drive 17 which produces actual response 21 that ideally replicates the desired remote transducer response 22 (hereinafter "desired response"). The inverse physical system model $H(f)^{-1}$ is represented at 72, while physical system (vibration system, test vehicle, remote transducers and instrumentation) is represented at 10. Referring to FIG. 3B, at step 78, the inverse model 72 is applied to a target response correction 77 in order to determine an initial drive 17 $x_1(t)$. The target response correction 77 can be the desired response 22 for the initial drive, though most often it is reduced by a relaxation gain factor 95. The calculated drive 17 $x_1(t)$ from the inverse model 72 is then applied to the physical system 10 at step 80. The actual remote transducer response 21 (hereinafter "actual response") $y_1(t)$ of the physical system 10 to the applied drive 17 $x_1(t)$ is then obtained at step 86. If the complete physical system 10 is linear (allowing a relaxation gain 95 of unity), then the initial drive 17 $x_1(t)$ could be used as the required drive. However, since physical systems are typically non-linear, the correct drive 17 has to be arrived at by an iterative process. (As appreciated by those skilled in the art, drive 17 used in previous tests for a similar physical system may be used as the initial drive.)

The iterative process involves recording the first actual response $y_1(t)$ resulting from the initial drive $x_1(t)$ and comparing it with the desired response 22 and calculating a response error 89 $\Delta y_1$ as the difference at step 88. (The first actual response signal $y_1(t)$ is provided at 87 in FIG. 4A.) The response error 89 $\Delta y_1$ is compared to a preselected threshold at step 90 and if the response error 89 exceeds the threshold an iteration is performed. Specifically the response error 89 $\Delta y_1$ is reduced by the relaxation gain factor 95 to provide the new target response correction 77. In this embodiment, the inverse transfer function $H(f)^{-1}$ is applied to the new target response correction 77 to create a drive correction $\Delta x_2$ 94 (step 91) that is added to the first drive $x_1(t)$ 17A to give a second drive $x_2(t)$ 17 at step 92. The iteration process (steps 80-92) is repeated until the response error 89 is brought down below the preselected threshold on all channels of the response. The last drive 17, which produced a response 21, that was within the predetermined threshold of the desired response 22, can then be used to perform specimen testing.

As described, the response error 89 $\Delta y$ is commonly reduced by the relaxation gain factor (or iteration gain) 95 to form the target response correction 77. The iteration gain 95 stabilizes the iterative process and trades off rate-of-convergence against iteration overshoot. Furthermore, the iteration gain 95 minimizes the possibility that the test vehicle will be overloaded during the iteration process due to non-linearities present in the physical system 10. As appreciated by those skilled in the art, an iteration gain can be applied to the drive correction 94 $\Delta x$ and/or the response error 89. It should be noted in FIG. 4A that storage devices 38 can be used to store the desired response 22, the actual responses 21 and previous drives 17A during the iterative process. Of course, memory 34 can also be used. Also, a dashed line 93 indicates that the inverse model 72 is an estimate of the inverse of the physical system 10. The block diagram of FIG. 4A, as discussed above, can be implemented by those skilled in the art using commercially available software modules such as included with the RPC™ trademark from MTS Systems Corporation of Eden Prairie, Minnesota.

Figure 3C:
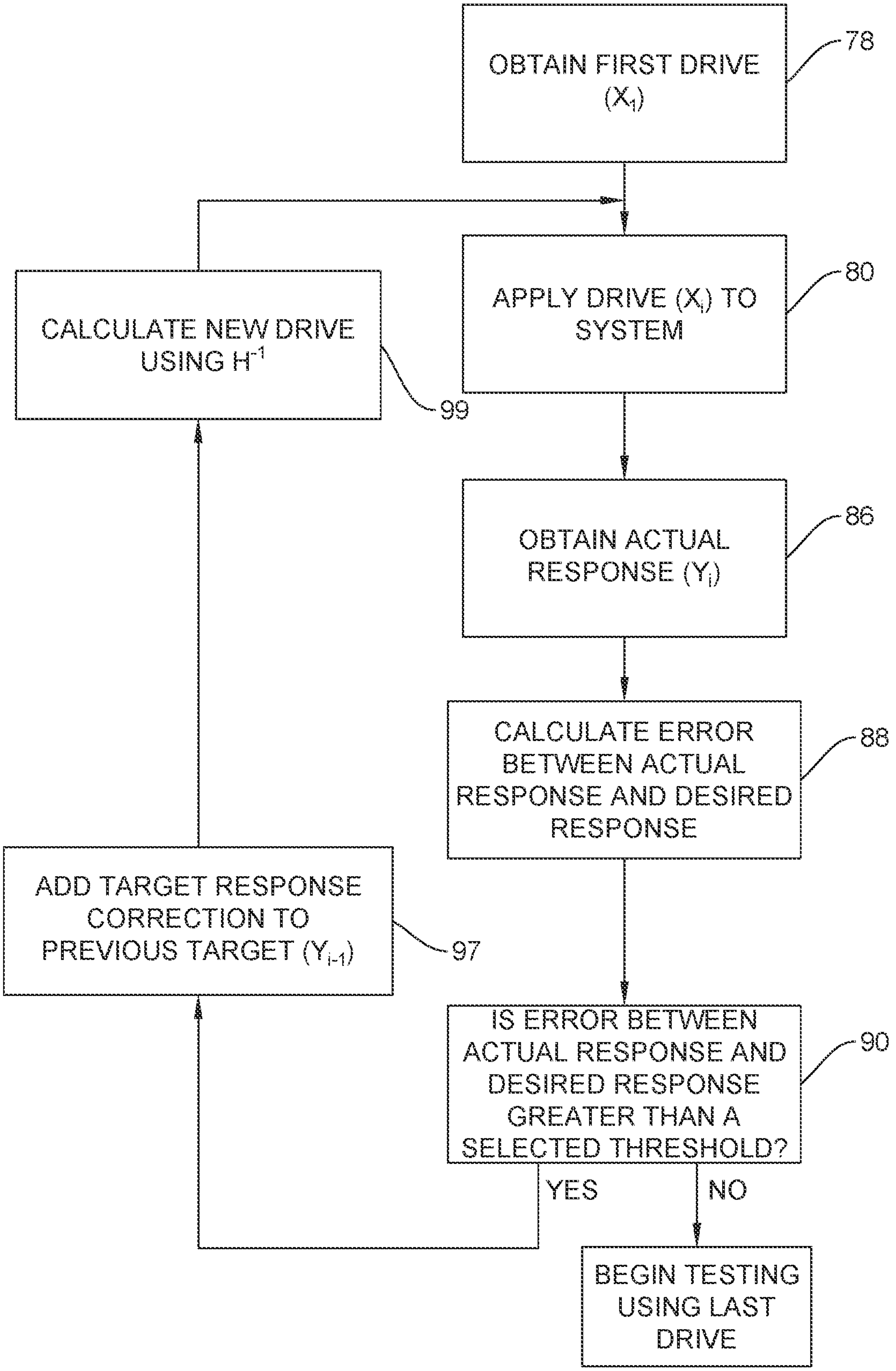
FIG. 3C is a flow chart illustrating the steps involved in another iterative phase of a prior art method of vibration testing.
Figure 4B:
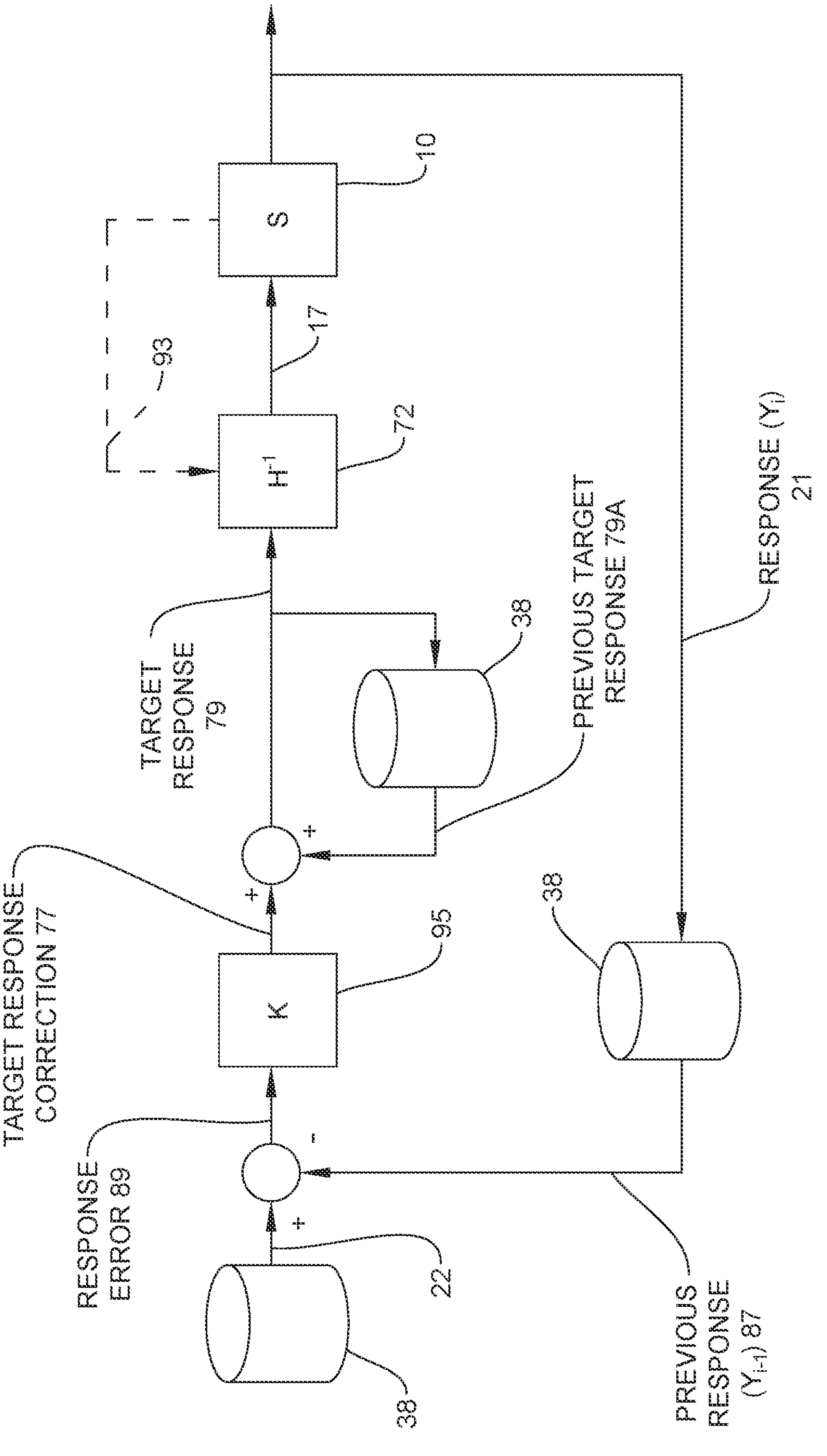
FIG. 4B is a detailed block diagram of another prior art iterative process for obtaining drive signals for a vibration system with the adjuster of the present invention.

At this point, a modified method of the prior art for calculating the drive can also be discussed. The modified prior art method includes the steps of the identification phase illustrated in FIG. 3A and many of the steps of the iterative phase illustrated in FIG. 3B. For convenience, the iterative steps of the modified method are illustrated in FIG. 3C and the block diagram as illustrated in FIG. 4B. As illustrated in FIG. 4B, the calculation of the target response correction 77 is identical. However, if the response error 89 between the actual response 21 and the desired response 22 is greater than a selected threshold, then the target response correction 77 is added to a previous target response 79A at step 97 to obtain a new target response 79 for the current iteration. The inverse model 72 is applied to the target response 79 to obtain the new drive 17. As illustrated in FIG. 4B, the iteration gain 95 can be used for the reasons discussed above.

It should be noted that the last drive 17 to be used for testing is commonly associated with a period of time during the test and that other drives would be computed in the same way for different time periods of the test. For instance, in the case of testing a vehicle, it may be desirable to simulate the vehicle traveling over different types of roads such as smooth freeway driving, driving on a gravel road, driving over a cobblestone road, etc. Since each of these road surfaces have associated sensor responses that are quite different from each other, an operator typically must come up with a drive to be used during testing using the iterative process described above for each type of road surface. A complete test then comprises successive time periods where the drives for each type of road surface are used to control the system as desired by the test to be performed, which commonly includes using the drives repeatedly many times.

During testing it is quite common to monitor the changes of the responses over time to help ensure that the outputs in the responses to these various drives being used remains relatively constant or within tolerable limits of a monitored parameter such as amplitude over the course of a test. By way of example only when testing a vehicle, the test can simulate traveling 50,000 to 300,000. As such, the test can easily span multiple days, where tests taking weeks or months is not uncommon.

In order to ensure the integrity of the test, it is desirable to monitor one or more outputs of the response during the test and compare the current test results to outputs of an initial response. Typically, the comparison is statistically made and trends in the outputs can be analyzed, which can include plotting the statistical results over time. This is very helpful for the operator to understand how the test is going and the nature of the test specimen such as the vehicle in this example. Currently, the operator would need to scrutinize the initial response data so as to qualify the data to be used as reference data to which later test response data is compared for trend monitoring. Qualification of reference data commonly falls upon the responsibility of the operator. This usually requires an operator with considerable experience, but nevertheless was laborious and errors still could be made. In many cases, the initial data is used as the reference data without any qualification, but rather on the belief that it is good. If the reference data was not a good reference for the test to be performed, but was used inadvertently, the test may need to be repeated, which can be quite expensive and cause considerable delays.

Generally, a method allows an operator to use pre-qualified reference data to determine limits in the same statistical domain for one or more outputs, which can be used to qualify reference data for use during a test. With this method, each drive is applied to the system where a controller receives the data. The controller automatically scrutinizes the data received comparing each output received to its associated set of acceptable limits. If one or more of the limits are violated, the output(s) will be identified to the operator and the received data will be disqualified or otherwise not used. The operator can then mitigate the error(s) and reapply the drive(s) to acquire new response data. When received response data does indeed meet all limits, the data can be considered qualified reference data that is then used during testing.

Figure 5:
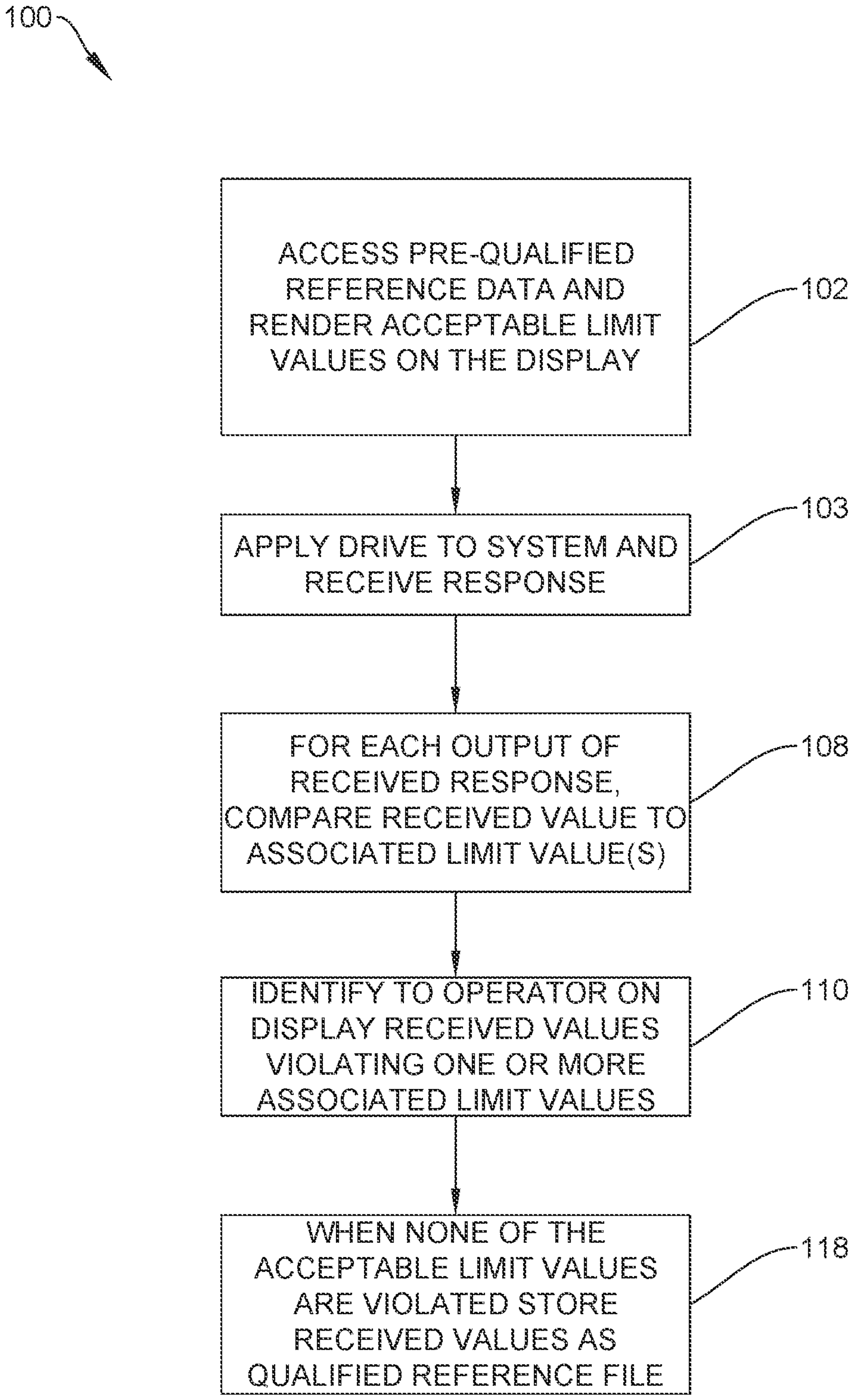
FIG. 5 is a flowchart for obtaining qualified reference data.

A method 100 for using pre-qualified reference data (typically stored in memory as a qualified reference file) that can be used to generate another file of qualified reference data that is used during the test for monitoring is illustrated in FIG. 5. The "pre-qualified" reference data has been determined earlier by the operator as having reference values that can be used to obtain acceptable limit values for each of the outputs as used as described below. Implemented on a computer such as the controller 23, the method controls the physical system having at least one actuator coupled to the test specimen to apply forces or to displace the test specimen or portions thereof. The physical system receives a drive comprising a plurality of drive command signals from the controller 23 for the at least one actuator and to generate a response. The response comprises a plurality of outputs from sensors measuring parameters of the physical system.

At step 102, the method 100 includes accessing pre-qualified reference data and rendering to an operator on the display of the controller one or more acceptable limit values associated with each pre-qualified reference value of the outputs of the response.

Step 102 can include rendering a GUI table on the display to the operator, an example of which is illustrated in FIG. 6 at 104. Table 104 includes rows having each of the outputs forming the response. Column 106 provides a descriptive identifier for each of the sensors providing output data. Column 107 indicates the full scale value for each output, while column 109 identifies the unit of measure for each of the outputs. The acceptable limit values for each output are provided in column 112 and/or column 114. In the embodiment illustrated, column 112 provides a lower limit value for each output while column 114 provides an upper limit value for each output. Although commonly, each output would have a lower limit acceptable value and an upper limit acceptable value, this should not be considered limiting. It should be noted column 116 that displays reference values for each of the outputs, in one embodiment, could be unfilled prior to receipt of a response.

Referring back to FIG. 5, at step 103, as described above, a drive is applied to the physical system and a response is received. It should be understood that the drive comprises inputs to the physical system that vary over a time period. Likewise, the outputs comprising the response will also vary over time.

Figure 7:
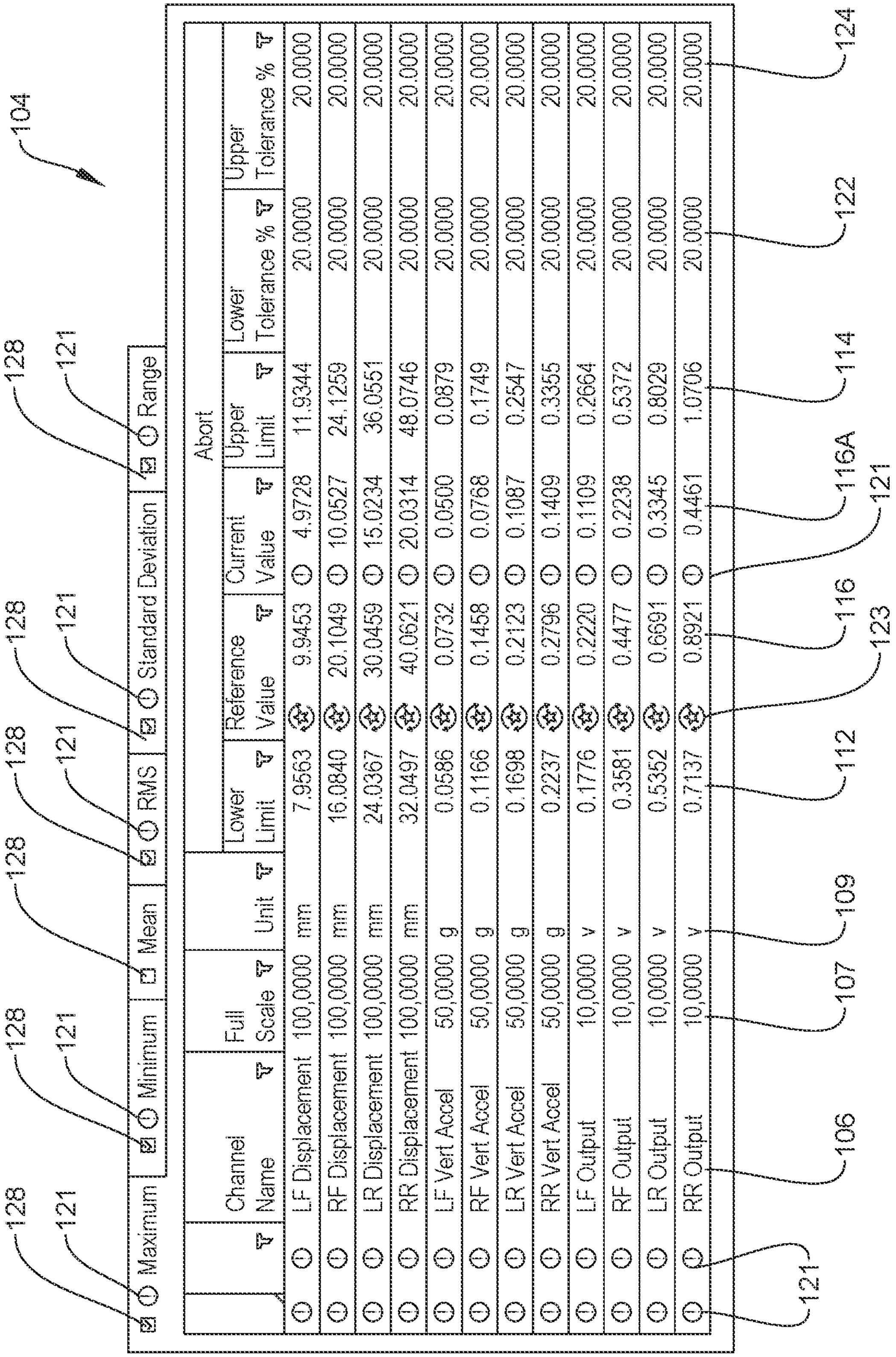

At step 108, the received values or measurements for each output of the response is compared with the associated limit values provided in columns 112 and/or 114. If an output violates at least one of the acceptable limit values, that output is identified to the user in the table 104 at step 110. Identification can take any number of forms. For instance, the row corresponding to the output that violated (in this example the output received being less than the lower acceptable limit or greater than the upper acceptable limit) the acceptable limit values could be a different color than the rest of the table and/or the text for the output could flash, or a special icon can be rendered to provide just a few of examples. In a preferred embodiment, the particular limit value that has been violated can be identified for example using different colors, flashing and/or some icon displayed next to the limit value that has been violated. FIG. 7 illustrates the table 104 where the current output values from the received response are found in column 116A have violated an associated acceptable limit value. In the embodiment illustrated, table 104 comprises a set of tables, described further below, that are identified with tabs. In this example icons 121 are used generously in the table 104 to alert the operator if one or more outputs has violated their associated acceptable limit values. In this case, all the outputs have violated their associated acceptable limit values in the table for the tab shown, while other tabs also have icon 121 indicating at least one output has violated one of its associated acceptable limit values.

If an acceptable limit value has been violated, typically the operator will need to take some corrective action to address the problem, the actions of which are numerous and do not form part of the present invention. After taking the corrective action, the operator will initiate the drive once again and receive a response from the physical system. When none of the acceptable limit values are violated, a valid or qualified reference value has been obtained for each of the outputs forming the response. The reference values of such a response are then considered qualified, thereby providing qualified reference data that can be stored at step 118 as a qualified reference file and can be used as described above for comparison during the test to monitor the test and/or detect trends that are occurring during the test. FIG. 6 is an example of a table 104 with qualified reference data. The reference value for each output is provided in column 116. Reviewing column 116, each reference value for each output falls between the acceptable lower limit in column 112 and the acceptable upper value in column 114. It should also be noted that if desired, if the acceptable limit values are obtained from another file stored in another portion of memory, the operator can have the ability to manually change any one of the acceptable limit values in columns 112 and 114 as desired.

The acceptable limit values are calculated or otherwise determined based on the pre-qualified reference value for each output.

Figure 8:
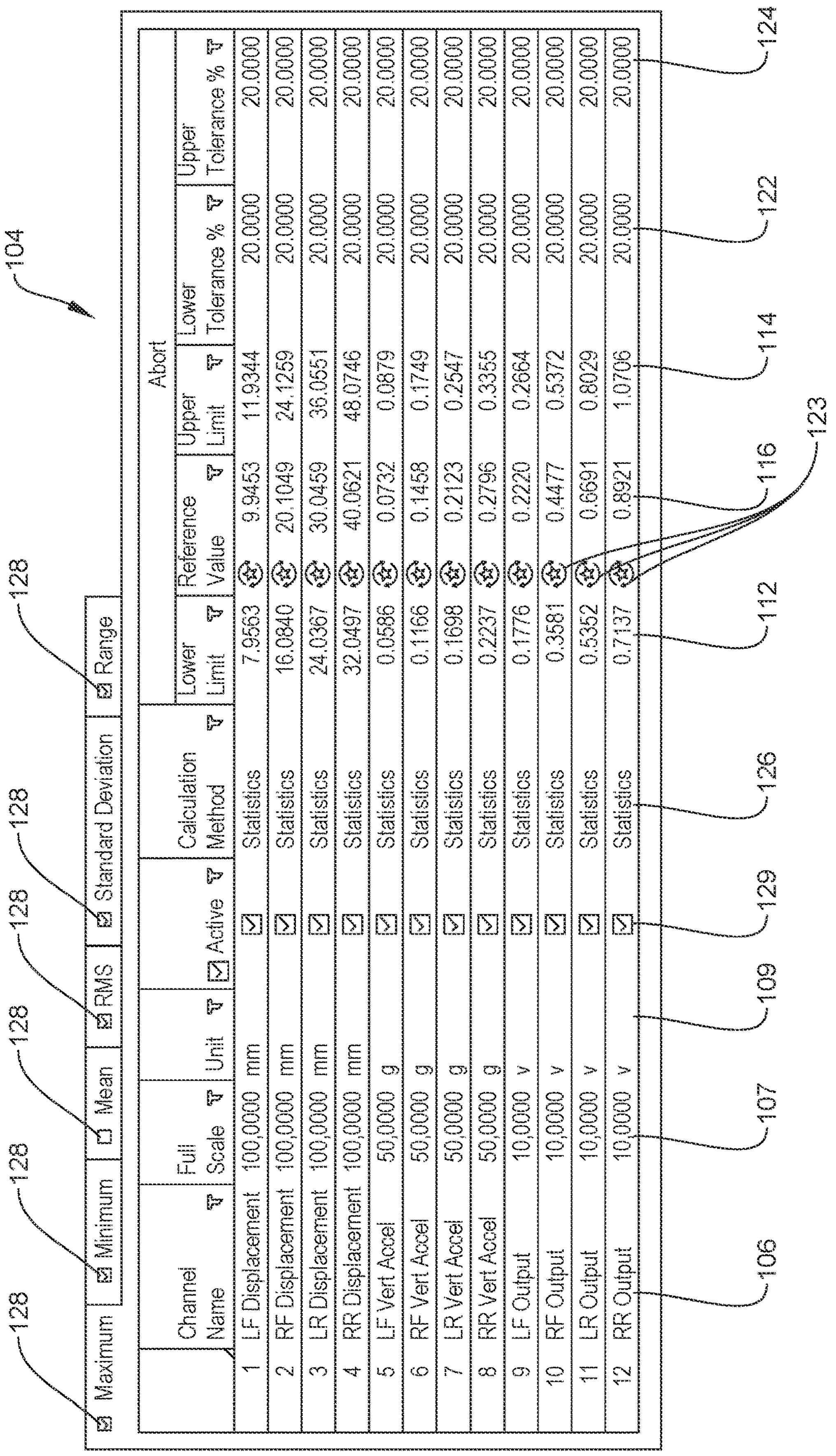

Referring to FIG. 8, the operator can access pre-qualified reference data (typically stored in memory and accessed as a pre-qualified reference file) and have each of the reference values for each corresponding output pre-populated in column 116. It should be understood that this pre-population of reference values is done before a drive is applied to the physical system to obtain the desired reference values for another set of qualified reference data that will be later used during testing. As such, at this point before the drive is applied, the values in column 116 again are not used for the test, but rather will be replaced if upon applying a drive the output from the received response falls between the associated acceptable limit values in columns 112,114. In order that the operator knows a value in column 116 is not the reference value to be later used in testing, but rather, a pre-qualified reference value that has been populated from the stored file, the value is visually identified as being from the pre-qualified reference file. Any number of identification techniques can be used to identify the pre-populated reference values such as use of a different color or font. In the embodiment illustrated, a special icon 123 is displayed proximate the reference value that identifies the reference value as being from the pre-qualified file and that upon the controller receiving a new response value that meets the associated acceptable limit values, it will be replaced with the value received. If desired as illustrated in FIG. 7 when an acceptable limit value has been violated, the current value being shown in column 116A, upon receipt of the response, column 116 can still be rendered showing the pre-qualified reference value of each output. In this embodiment, icon 123 is removed such as illustrated in FIG. 6 to indicate that the value now in column 116 has been qualified.

If the operator receives pre-qualified reference values for column 116, or even if the operator were to manually enter in a reference value in column 116, prior to applying a drive to obtain new reference values, the acceptable limit values can be automatically calculated if desired. In table 104, column 122 and column 124 comprise limit adjustment values for each of the outputs that are used to calculate the acceptable limit values in columns 112 and 114, respectively. In particular, the pre-qualified reference value in column 116 is multiplied by the value in column 122 to yield the acceptable limit value for column 112. Likewise, the pre-qualified reference value in column 116 in FIG. 8 is multiplied by the value in column 124 to yield the acceptable limit value in column 114. It should be noted in one embodiment, the automatic calculation of acceptable limit values can occur selectively for each output. In the embodiment, illustrated, whether automatic calculation of the acceptable limit values for a given output is selected in column 126. In this embodiment, the value for automatic calculation of the acceptable limit values is identified as "statistics" whereas if automatic calculation of the limit values is not to occur, a different value can be identified such as "manual", not shown. Operator adjustment of one or more acceptable limit values can be performed in step 102. It should be noted that the operator can adjust the acceptable limit values for any output by changing the value in columns 122 and 124 as desired, which in the embodiment illustrated comprise a scaler quantity identified herein as a percentage.

It should also be noted that in one embodiment, the operator can individually select whether or not the output will be used in obtaining an associated reference value. In the embodiment illustrated, column 129 provides a check box allowing the operator to indicate that an output value received for an output having a check in column 129 will be compared to the associated acceptable limit values.

As mentioned above, each output varies from a minimum value to a maximum value over a time period as the drive is being applied. Various measures can be used for forming the qualified reference values. For instance, table 104 identifies six different measures that can be used. These measures include the maximum value of the output over the time (identified by tab "Maximum", the minimum value of the output received over the time (identified by tab "Minimum", the mean value the output over the time (identified by tab "Mean", the RMS (root-mean-square) value of the output over the time (identified by tab "RMS"), the standard deviation of the values of the output over the time (identified by tab "Standard Deviation", and/or the range of values of the output over the time (identified by tab "Range"). The operator can individually select via associated check boxes 128 which measures are to be used in order to obtain the qualified reference data by selecting the associated check box provided in each of the measure tabs. Each measure has a corresponding table similar to that showed for the measure "Maximum".

It should be noted that the foregoing measures should not be considered limiting as other statistical measures can be used, each such statistical measure can include an associated tab in table 104. Likewise, the acceptable limit values being a range should not be considered limiting in that depending on the measure used the acceptable limit value may take another form rather than a single number, for instance, in the spectral domain an acceptable limit value can be related to amplitude(s) associated with frequency. Hence "value" herein is broader than a single number.

The pre-qualified reference data that is used to populate table 104 can be obtained in a number of different ways. In one embodiment, the pre-qualified reference data is the response received for the final drive that has been obtained using the iterative method described above with respect to FIGS. 3 and 4. However, it should be noted that the pre-qualified reference data used to obtain the qualified reference data that will be used during testing need not be directly obtained from the test specimen that will be used during testing. Rather, in some instances, the pre-qualified reference data can be associated with some other test specimen previously tested or a test specimen that is used only for obtaining pre-qualified reference data.

In another embodiment, the pre-qualified reference data can be assembled from portions of other response files having the desired output. FIG. 9 illustrates a GUI list 130 of outputs that is rendered to the operator, each of the outputs has an associated reference value, not shown, that the operator considers is useable as a pre-qualified reference value. In one embodiment, the list 130 can be response data from a prior test.

It should be understood that typically the operator will want to obtain qualified reference data for each drive that forms part of the overall test for the test specimen. Hence, the method described above is repeated as necessary so as to obtain qualified reference data for each drive.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A computer implemented method of controlling a physical system having at least one actuator coupled to a test specimen to apply forces to or displace the test specimen of portions thereof, the physical system receiving a drive comprising a plurality of drive command signals from a controller for the at least one actuator and outputting a response to the controller, the response comprising a plurality of outputs from sensors measuring parameters of the physical system, the method comprising:

deriving a first drive by applying successive test drives to the physical system and comparing associated received responses until associated received response suitably corresponds to a desired response;

accessing pre-qualified reference data comprising pre-qualified reference values for the outputs and rendering to an operator on a display one or more acceptable first limit values associated with each of the outputs of the response;

generating the first drive using the controller and applying the first drive to the physical system;

receiving, using the controller, a first response from the physical system;

for each output of the first response, comparing a received value with the associated one or more first limit values;

identifying to the operator on the display one or more outputs having a value violating one or more of the acceptable first limit values for the associated output of the first response;

identifying that at least one pre-qualified reference value is to be replaced with a value from the first response;

replacing each pre-qualified reference value with each associated value from the first response or subsequent responses when each associated value does not violate each associated first acceptable limit value;

storing the associated values as a qualified reference file; and using the qualified reference file during testing of the test specimen to monitor the test and/or detect trends during the test.

2. The method of claim 1 and further comprising calculating the first acceptable limit values from pre-qualified reference values corresponding to each output.

3. The method of claim 2 and further comprising:

accessing pre-qualified second reference data comprising pre-qualified second reference values for the outputs and rendering to the operator on the display one or more acceptable second limit values associated with each of the outputs of the response;

after applying the first drive, generating a second drive using the controller and applying the second drive to the physical system;

receiving, using the controller, a second response from the physical system;

for each output of the second response, comparing a received value with the associated one or more second limit values; and identifying to the operator on the display one or more outputs having a value violating one or more of the acceptable second limit values for the associated output of the second response.

4. The method of claim 1 and further comprising after rendering to the operator on the display the one or more acceptable first limit values associated with each of the outputs of the response, receiving input from the operator comprising one or more adjustments to the one or more acceptable first limit values associated with each of the outputs of the response.

5. The method of claim 4, wherein each limit adjustment value is indicative of a percentage.

6. The method of claim 1, wherein the acceptable first limit values correspond to a statistical measure of each output measured over a time period, the statistical measure being at least one of a minimum value during the time period, a maximum value during the time period, a mean value during the time period, a root mean square value during the time period, or a standard deviation value during the time period.

7. The method of claim 6, wherein one or more of the outputs have associated acceptable first limit values associated with two or more statistical measures, and wherein identifying comprises identifying which associated acceptable first limit value of which statistical parameter has been violated.

8. The method of claim 1 and further comprising:

storing the desired response as the pre-qualified reference data.

9. A testing system for testing a test specimen, the testing system comprising:

an actuator couplable to the test specimen to apply forces to or displace the test specimen of portions thereof;

sensors for providing outputs of measured parameters of the test specimen or the actuator;

memory having pre-qualified reference data;

a display; and a controller coupled to the memory and the display and configured to control the actuator using drives and configured to receive associated responses comprising the outputs from sensors and wherein the controller is configured to derive a first drive by applying successive test drives to the physical system and comparing associated received responses until associated received response suitably corresponds to a desired response;

render on the display one or more acceptable first limit values associated with each of the outputs of the response, the one or more acceptable first limit values being based on a pre-qualified reference values in the pre-qualified reference data for each output;

generate the first drive using the controller and apply the first drive to the actuator;

receive a first response from the sensors;

for each output of the first response, comparing a received value with the associated one or more first limit values;

identify to the operator on the display one or more outputs having a value violating one or more of the acceptable first limit values for the associated output of the first response;

identify that at least one pre-qualified reference value is to be replaced with a value from the first response;

replace each pre-qualified reference value with each associated value from the first response or subsequent responses when each associated value does not violate each associated first acceptable limit value;

store the associated values as a qualified reference file; and use c during testing of the test specimen to monitor the test and/or detect trends during the test.

10. The testing system of claim 9, wherein the controller is configured to calculate the first acceptable limit values from the pre-qualified reference value corresponding to each output.

11. The testing system of claim 9, wherein the controller is configured to after rendering on the display the one or more acceptable first limit values associated with each of the outputs of the response, receive input from an input device, the input comprising one or more adjustments to the one or more acceptable first limit values associated with each of the outputs of the response.

12. The testing system of claim 9, wherein the controller is configured to receive input from the operator comprising one or more adjustments to the one or more acceptable first limit values associated with each of the outputs of the response.

13. The testing system of claim 9, wherein the acceptable first limit values correspond to a statistical measure of each output measured over a time period, the statistical measure being at least one of a minimum value during the time period, a maximum value during the time period, a mean value during the time period, a root mean square value during the time period, or a standard deviation value during the time period.

14. The testing system of claim 13 wherein one or more of the outputs have associated acceptable first limit values associated with two or more statistical measures, and wherein identifying comprises identifying which associated acceptable first limit value of which statistical parameter has been violated.

15. The testing system of claim 14, wherein the controller is configured to store the desired response as the pre-qualified reference data.

16. The testing system of claim 14, wherein the controller is configured to access pre-qualified second reference data comprising pre-qualified second reference values for the outputs and render on the display one or more acceptable second limit values associated with each of the outputs of the response;

after applying the first drive, generate a second drive using the controller and apply the second drive to the actuator;

receive a second response from sensors;

for each output of the second response, compare a received value with the associated one or more second limit values; and identify on the display one or more outputs having a value violating one or more of the acceptable second limit values for the associated output of the second response.

* * * * *